UNITED STATES PATENT OFFICE 1,952,017

METHOD FOR REDUCING THE VISCOSITY OF A COLLOIDAL SUSPENSION OF PROTEINS

Alan Leighton, Cottage City, Md., and Abraham Leviton, Washington, D. C.

No Drawing. Application January 2, 1932, Serial No. 584,582

5 Claims. (Cl. 127—31)

(Granted under the act of March 3, 1883, as amended April 30, 1928; 370 O. G. 757)

This application is made under the act of March 3, 1883, as amended by the act of April 30, 1928, and the invention herein described and claimed may be used by or for the Government of the United States or any of its officers or employees in the prosecution of work for the Government or by any citizen of the United States without payment to us of any royalty thereon.

In the manufacture of ice cream it has not been feasible heretofore to use a milk-solids-not-fat content higher than 10 per cent of the ice cream mix by weight, because of the fact that if higher concentrations were used the milk sugar tended to crystallize causing the defect in the ice cream known as "sand". Ice cream manufacturers have found that ice cream containing more than 10 per cent of milk-solids-not-fat is apt to become "sandy" through the development of lactose crystals large enough to be detected when the ice cream is eaten.

Lactose, or milk sugar, is a normal constituent of milk, being present in a ratio of approximately 5 parts lactose to 90 parts water. Lactose is comparatively insoluble. At a temperature of, for instance, 15° C. 16.9 parts may be contained in 100 parts of water. To cause the separation of lactose as crystals from milk it is therefore necessary that the water be removed from the milk by evaporation until, for instance, at 15° C. there are present more than 16.9 parts lactose to 100 parts of water. Considerable quantities of lactose cannot be separated unless milk be highly concentrated. When skim milk, for instance, is concentrated to have 130 parts milk-solids to 100 parts of water, a concentration at which it would theoretically be possible to separate about three-quarters of the lactose normally present, it is so viscous and heavy that it assumes the properties of a solid or semi-solid material. It also becomes markedly thicker on standing. This high viscosity interferes with the growth of lactose crystals and also makes it mechanically impossible to separate them from the mass once they are formed.

The apparent viscosity of a colloidal suspension, such as milk, is dependent upon the viscosity of the liquid phase of the milk, and also upon the ratio of the volume of the dispersed solids, such as protein and some of the salts that are contained in the milk, to the total volume of the suspension.

We have found that the danger of lactose separation in ice cream can be avoided, and at the same time higher percentages of milk solids can be employed if the milk sugar is removed from the material used as the source of milk-solids-not-fat. Heretofore, it has not been possible to do this.

Our invention relates to the preparation of a concentrated skim and/or whole milk, low in lactose content, through a reduction in the internal friction or apparent viscosity of concentrated normal skim and/or whole milk by the addition of a suitable amount of cane-sugar or any other sugar or any other chemically inert highly soluble noncoagulants, which is a substance highly soluble in the dispersing medium which when added to the suspension under consideration will not react chemically with any of the ingredients, nor produce coagulation of any of the suspended material, the purpose being to reduce the apparent viscosity of normal concentrated milk to such an extent that crystalline milk sugar may be mechanically separated from the mass. If normal unsweetened skim and/or whole milk is concentrated to a degree which will permit of the crystallization of a considerable portion of the contained milk sugar, the milk is too thick or too viscous to handle.

We have discovered by our invention that the presence of suitable substances, such as cane sugar or dextrose, in suitable amounts in milk, as above mentioned, reduces the thickness or viscosity of the milk and prevents thickening to such an extent that it is possible to separate mechanically the lactose crystals by centrifugal means or by filtration, when the milk has been sufficiently concentrated to force the crystallization of as much as 75 to 85 per cent of the milk sugar normally present. Such a concentrated low lactose skim and/or whole milk is suitable for use to prevent "sandiness"; to enhance flavor, body and texture in the manufacture of ice cream; confections; food products and the like.

The milk described above, after it is prepared, by our invention, can be preserved from bacteriological spoilage by the use of additional amounts of sugar, by heat sterilization, by further concentration or by powdering, i. e., by drying.

We have found the presence of cane sugar or similar materials reacts with particular effectiveness to reduce the viscosity of such a suspension during and after the condensation process in one or all of three ways. The cane sugar in going into solutions in the liquid phase of the milk increases the volume of the liquid phase of the milk by an amount equal to that of its own solid volume. This is equivalent to decreasing the volume percentage of the solids and in spite of the fact that the presence of the sugar in the liquid phase of the milk will tend to increase the viscosity of that phase a reduction in apparent viscosity results, not only because of the increased volume of the dispersing medium in itself, but also because of the effect of the increased volume of the dispersing medium during the condensing and aging process.

We have also found that cane sugar may peptize the solids of the milk, that is, it may through adsorption upon the surface of the solid particles cause a disintegration of the particles with a resulting viscosity decrease of the mass.

We have further discovered that it may also exert a dehydrating action, in other words, the osmotic pressure of the sugar solution is such that it causes water contained in the milk particles to diffuse into the sugar solution, causing the particles to break up and shrink. This also means a reduction in the viscosity.

The increase in the volume of the liquid phase of the milk, which is equivalent to a diluting action of the sugar, is, we have found to be, an important factor of our invention. As an illustration, if 6 grams of cane sugar are added to 100 grams of milk and the mass concentrated to such a degree that there are present 130 parts of milk-solids-not-fat to 100 parts of water, the volume of the liquid phase of such a milk is approximately 1⅓ times greater than if cane sugar had not been added.

Upon the principles hereinabove outlined the following process has been discovered by us for the separation of lactose from concentrated milk:

We have found that when cane sugar is used, the best results are obtained when about 6 parts are added to about 100 parts of milk. The sweetened milk should then be forewarmed to about 63° C. for about one-half an hour to pasteurize the mass. It is then drawn into a receptacle such as a vacuum pan or the like and concentrated at a temperature of from 35 to 45° C. until the desired amount of water is removed. While this is the best procedure, the cane sugar may be added after pasteurization, or even after condensing. The concentrated product is then cooled to about 15°C. and held at approximately this temperature until lactose crystals have formed. These crystals are separated from the rest of the milk by either filtration, centrifuging, or other mechanical means. As a more concrete illustration of our process the following is submitted:

To 4000 grams of milk, add 240 grams of cane sugar, forewarm the mixture at about 63° C. for about 30 minutes, and concentrate the mixture under a vacuum to a concentration of about 71.4 per cent of total solids, or about 150 parts milk solids to 100 parts of water. This material has an apparent viscosity of approximately 1,200 centipoises. Upon standing for about 24 hours at about 15° C. 156 grams or 71.4 per cent of the lactose will crystallize and should be separated by mechanical means from the mixture to give a milk product that is low in its lactose content. This represents a separation of about 91 per cent of the theoretical amount possible.

As a result of the foregoing process, we obtained a concentrated milk from which a greater portion of the milk sugar has been removed but containing in the unaltered form all of the other natural constituents of the milk.

In the carrying out of our invention, as hereinbefore set forth, in addition to obtaining low lactose milk, we also obtain at the same time lactose of a high degree of purity and free from color.

We have found that our product herein described may be preserved from spoilage in a number of ways. In the first place, after the separation of the milk sugar, sufficient sugar may be added to preserve it; or (2) the material may be further concentrated to a point such as that the sugar concentration is sufficient to insure its keeping; or (3) the material may be sterilized by heat; or (4) both the addition of the desired amount of sugar and further concentration may be employed; and, (5) the material can also be dried to a powder, as in the preparation of powdered milk.

While we have found that the percentages, temperatures and methods, hereinbefore described, are better adapted to the successful operation of our invention, we do not wish to be restricted by them.

Having thus fully described our invention, we claim:

1. A method for making a concentrated milk product that is low in lactose content, which comprises adding sucrose to concentrated milk, lowering the temperature to a degree necessary to cause crystallization, and separating the crystalline lactose therefrom.

2. A method for making from milk a concentrated milk product that is low in lactose content, which comprises adding sucrose to milk, concentrating the resulting mixture, lowering the temperature to a degree necessary to cause crystallization, separating the crystalline lactose therefrom.

3. A method for obtaining lactose from a highly concentrated milk, which comprises adding sucrose to concentrated milk, lowering the temperature to a degree necessary to cause crystallization, and recovering the crystalline lactose therefrom.

4. A method for obtaining crystalloids from a highly concentrated milk, which comprises adding sucrose to milk, concentrating the resulting mixture, lowering the temperature to a degree necessary for crystallization, and recovering the crystals from the suspension.

5. The use of a concentrated colloidal suspension, that is low in crystalloids, in the manufacture of confections, produced by adding sucrose to a suspension containing crystalloids, thence forcing their crystallization, removing the crystalloids, and adding the remaining material to the ingredients that form the essentials in confectionery manufacture.

ALAN LEIGHTON.
ABRAHAM LEVITON.